(12) United States Patent
Esch et al.

(10) Patent No.: US 6,331,361 B1
(45) Date of Patent: Dec. 18, 2001

(54) METHODS FOR MANUFACTURE AND REPAIR AND RESULTING COMPONENTS WITH DIRECTIONALLY SOLIDIFIED OR SINGLE CRYSTAL MATERIALS

(75) Inventors: Hans van Esch, Seabrook; Wayne Greaves, Houston, both of TX (US)

(73) Assignee: Hickham Industries, Inc., La Porte, TX (US)

( * ) Notice: Subject to any disclaimer, the term of this patent is extended or adjusted under 35 U.S.C. 154(b) by 0 days.

(21) Appl. No.: 09/611,200

(22) Filed: Jul. 6, 2000

Related U.S. Application Data

(63) Continuation of application No. 09/196,081, filed on Nov. 19, 1998, now abandoned.

(51) Int. Cl.$^7$ .............................. F04D 29/30; B23P 6/00; B23K 31/02
(52) U.S. Cl. ..................... 428/548; 428/615; 29/889.1; 228/119; 228/245; 415/12
(58) Field of Search ..................................... 428/546, 544, 428/548, 615; 228/245, 119, 194, 195, 246, 208, 256; 164/122, 122.1, 122.2, 123, 124, 125, 126, 127, 128; 29/889, 889.1, 889.2, 889.21, 889.22, 889.23, 889.3, 889.4, 889.5, 889.6, 889.61, 889.7, 889.71, 889.72; 415/12

(56) References Cited

U.S. PATENT DOCUMENTS

| | | | |
|---|---|---|---|
| 4,008,052 | * | 2/1977 | Vishnevsky et al. . |
| 4,529,452 | * | 7/1985 | Walker . |
| 4,587,700 | * | 5/1986 | Curbishley et al. . |
| 5,272,809 | * | 12/1993 | Robertson et al. . |
| 5,312,650 | * | 5/1994 | Dalal et al. . |
| 5,318,217 | * | 6/1994 | Stinson et al. . |
| 5,783,318 | * | 7/1998 | Biondo et al. . |
| 5,836,075 | * | 11/1998 | Fitzgerald et al. . |
| 6,098,871 | * | 8/2000 | Cairo et al. . |

* cited by examiner

Primary Examiner—Tom Dunn
Assistant Examiner—Kiley Stoner
(74) Attorney, Agent, or Firm—Ira J. Schaefer, Esq.; Clifford Chance Rogers & Wells LLP

(57) ABSTRACT

A method for manufacturing and repair wherein a component composed of equiaxed cast or wrought alloys has at least one section joined thereto composed of directionally solidified or single crystal material

16 Claims, 1 Drawing Sheet

METHODS FOR MANUFACTURE AND REPAIR AND RESULTING COMPONENTS WITH DIRECTIONALLY SOLIDIFIED OR SINGLE CRYSTAL MATERIALS

This application is a continuation of application Ser. No. 09/196,081 filed Nov. 19, 1998, now abandoned.

BACKGROUND OF THE INVENTION

The present invention relates to the repair and manufacture of components, preferably turbo-machinery components, by the insertion of directionally solidified or single crystal sections into parts comprised mostly of equiaxed cast or wrought alloys.

Thermal mechanical fatigue, oxidation/corrosion, and creep all play a role in the overall life expectancy of components and in particular, turbo-machinery components operating at high temperatures. These mechanisms produce cracking and microstructural degradation in all areas of the component but the most severe damage usually occurs at the leading and trailing edges of vanes. The entire component is typically manufactured from a single forging or is cast. During a repair process, the most damaged areas are often replaced with new "coupon" pieces of equiaxed cast or wrought material. These coupons or inserts are usually welded into position.

SUMMARY OF THE INVENTION

Since the stresses in many of the most critical areas are unixal, the main object of the present invention is to provide a method of manufacturing and repair wherein additional strength in the direction of primary loading is obtained to improve the components' physical strength and in-service life. High temperature materials are weakest at the boundaries between the individual grains of metal. Directionally solidified castings are produced by special processes, which cause the grain to grow uniformy in a single direction. The result is a material which has greater strength in a single direction (the direction of grain orientation), because there are no grain boundaries normal to the applied loading direction. Single crystal materials do not have grain boundaries and have improved strength in multi-axial loaded conditions.

Directionally solidified and single crystal materials have been used for years in rotating hot section blades to increase the creep and thermal mechanical fatigue properties of those parts. In recent years, this same technology has been successfully applied to materials for whole stationary components. Both of these casting processes are limited by the size of the product. It becomes increasingly difficult to maintain the proper structure and grain orientation as the casting size increases. Another object of the present invention is to provide a composite component manufactured primarily from a forging or conventional casting with one or more directionally solidified or single crystal inserts in critical areas to improve the overall performance of the part. A further object is the modification and improvement of established product designs and the insertion or replacement of critical areas of service exposed, equiaxed components with directionally solidified or single crystal materials to increase the remaining life expectancy.

These and other objects of the invention are achieved in accordance with the invention by a method form manufacturing, comprising the steps of providing a component composed of equiaxed cast or wrought alloys and joining at least one section composed of directionally solidified or single crystal material to the component. The at least one section can be joined by welding or other joining process. In one embodiment, the component is composed of equiaxed cast or wrought alloys and is provided without the at least one section. The component can be a gas turbine vane without leading and trailing edge sections thereof and wherein the at least one section comprises the leading and trailing edge sections of the gas turbine vane with respect to a direction of the gas therethrough. In that embodiment, the directionally solidified or single crystal material in the leading and trailing edge sections preferably have a grain orientation normal to the direction of gas.

Another embodiment of the invention is a method for repairing a component, comprising the steps of providing a component composed of equiaxed cast or wrought alloys, removing at least one section of the component, providing at least one new section composed of directionally solidified or single crystal material and joining the at least one new section to the component. Where the component is a gas turbine vane, the at least one section preferably comprises leading and trailing edge sections of the gas turbine vane with respect to a direction of gas therethrough. In that embodiment, the directionally solidified or single crystal material in the leading and trailing edge sections preferably have a grain orientation normal to the direction of the gas.

A further embodiment of the invention is an article of manufacture comprising a section composed of equiaxed cast or wrought alloys and at least one section composed of directionally solidified or single crystal material joined thereto.

DETAILED DESCRIPTION OF THE INVENTION

The invention is an application of several existing technologies, the most important of which are the directional solidification and single casting techniques.

In most high temperature alloys, the grain boundaries are the weakest region of the structure. Over time at elevated temperature and stress, precipitation of continuous networks form. These networks reduce the adhesion of the grains allowing voids to form along the boundary traversing the direction of loading. When these voids coalesce, rupture soon follows. By eliminating the grain boundaries that traverse the loaded direction, creep rupture strengths can be improved.

In conventional investment castings, grains are allowed to nucleate and grow randomly. Directionally solidified castings have a grain orientation parallel to the primary loading direction, whereas single crystal castings eliminated grain boundaries altogether.

In high temperature applications where the majority of loading is in a single direction, critical areas can be made from directional solidified or single crystal materials. These sections can be welded, brazed, or in some other way joined, to the equiaxed part. In a manufacturing scenario, the part would be formed without the section intended to be upgraded or the area would be replaced or added once the part was complete. When an existing design is to modified after some time in service, the damaged section would be removed, the joining faces properly prepared, and the directionally solidified or single crystal section inserted.

EXAMPLE 1

Figure 1:
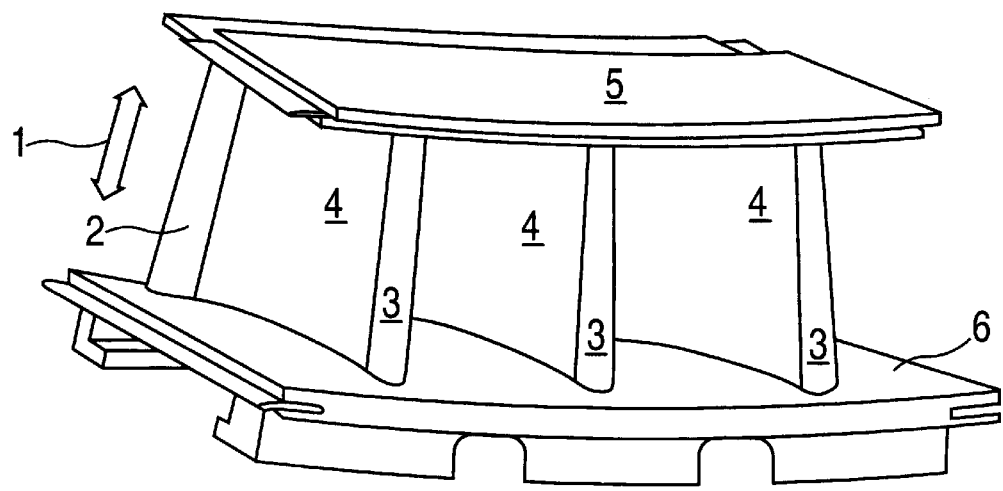
FIG. 1 is a perspective view of a typical gas turbine stationary segment for repair in accordance with the present invention.
Figure 2:
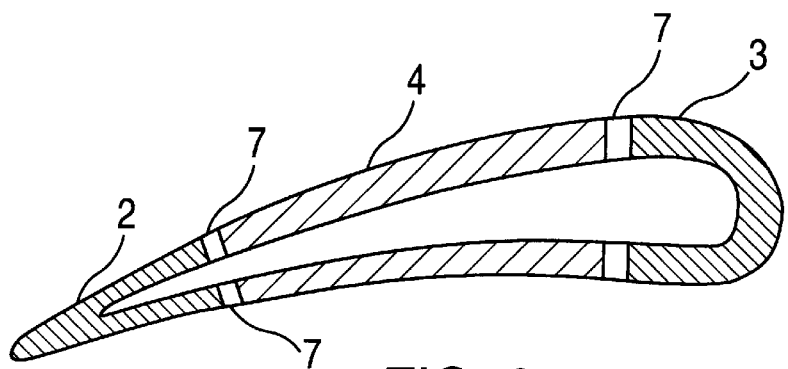
FIG. 2 is a cross-sectional view of a gas turbine vane with leading and trailing edge inserts repaired according to the present invention.

Referring now to FIGS. 1 and 2, during a repair process, the leading 3 and trailing 2 edges of the vanes 4 are removed by sectioning along the inner sidewall 5, outer sidewall 6, and the remainder of the vane 4. The directionally solidified or single crystal inserts are connected by welds 7 into position with the grain orientation 1 normal to the direction of the gas path.

The original portion of the part is cobalt-based and the directionally solidified coupon is a cobalt based superalloy having a nominal composition of 29.5% Cr, 10.5% Ni, 7% W, 0.25% C, 0.7% Mn, and 0.75% Si. A cobalt based superalloy filer material having a nominal composition of 20% Cr, 15% W, and 10% Ni is used with a manual gas tungsten arc welding process.

If the original part is a nickel-based alloy, the insert would be a nickel based superalloy having a nominal composition of 16% Cr, 8.5% Co, 3.5% Al, 3.5% Ti, 2.6% W, 1.8% Mo, and 0.9% Cb. The welding alloy would be a nickel based superalloy filler material having a nominal composition of 22% Cr, 9% Mo, 4% Cb, and 3% Fe.

EXAMPLE 2

Figure 3:
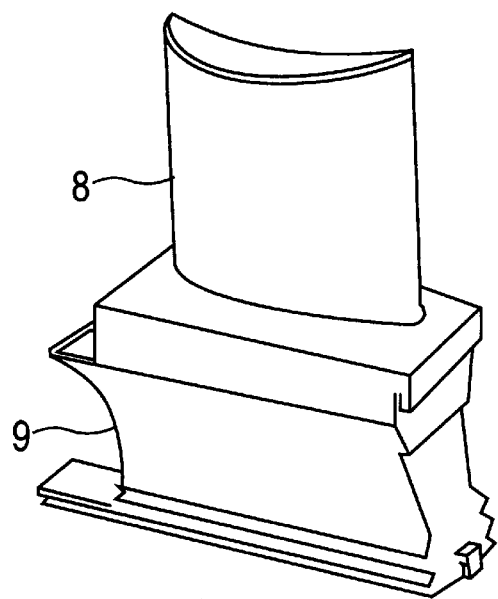
FIG. 3 is a perspective view of a gas turbine blade manufactured according to the present invention.

Referring to FIG. 3, a gas turbine blade is originally manufactured from a wrought nickel-based alloy having a nominal composition of 19% Cr, 12% Co, 6% Mo, 3% Ti, and 2% Al. To upgrade the airfoil section 8, the original wrought airfoil is sectioned from the shank and root 9. The directionally solidified or single crystal airfoil having an approximate composition as that in Example 1, is brazed to the root section 9. The braze foil has a nominal composition of 8% Cr, 10% Co, 10% W, 3% Ta, 3% Al, 0.3% B, and 0.5% Al. Once the braze foil is applied and airfoil properly aligned in relation to the root section, the blade is vacuum heat treated to a temperature of 2150° F. The resulting blade will have improved life at design conditions or will be able to withstand higher operating temperatures than those originally specified.

What is claimed is:

1. A method for manufacturing, comprising the steps of:
   providing a component composed of equiaxed cast or wrought alloys; and
   joining at least one section composed of directionally solidified or single crystal material to the component by using a filler material disposed therebetween.

2. A method for repairing a component, comprising the steps of:
   providing a component composed of equiaxed cast or wrought alloys;
   removing at least one section of the component;
   providing at least one new section composed of directionally solidified or single crystal material; and
   joining at least one new section to the component by using a filler material disposed therebetween.

3. An article of manufacture comprising: a section composed of equiaxed cast or wrought alloys and at least one section composed of directionally solidified or single crystal material joined thereto with a filler material disposed therebetween.

4. An article of repair comprising: a section composed of equiaxed cast or wrought alloys and at least one section composed of directionally solidified or single crystal material joined thereto with a filler material disposed therebetween.

5. The method according to claim 1, wherein the at least one section is joined by welding.

6. The method according to claim 1, wherein the component composed of equiaxed cast or wrought alloys is provided without the at least one section.

7. The method according to claim 6, wherein the component is a gas turbine vane without leading and trailing edge sections thereof and wherein the at least one section comprises the leading and trailing edge sections of the gas turbine vane with respect to a direction of the gas therethrough.

8. The method according to claim 7, wherein the directionally solidified or single crystal material in the leading and trailing edge sections have a grain orientation normal to the direction of gas.

9. The method according to claim 2, wherein the component is a gas turbine vane and the at least one section comprises leading and trailing edge sections of the gas turbine vane with respect to a direction of gas therethrough.

10. The method according to claim 9, the directionally solidified or single crystal material in the leading and trailing edge sections have a grain orientation normal to the direction of the gas.

11. The method according to claim 1 or 2, wherein the at least one section is joined by arc welding.

12. The method according to claim 11, wherein the filler material is a nickel based superalloy.

13. The method according to claim 1 or 2, wherein the at least one section is joined by brazing.

14. The method according to claim 13, wherein the filler material is a braze foil.

15. The article according to claim 3 or 4, wherein the filler material is a nickel based superalloy.

16. The article according to claim 3 or 4, wherein the filler material is a braze foil.

* * * * *